Sept. 2, 1958 G. E. CHILTON ET AL 2,850,645
CONTINUOUS READING ELECTRONIC MICROMETER
Filed Feb. 16, 1954
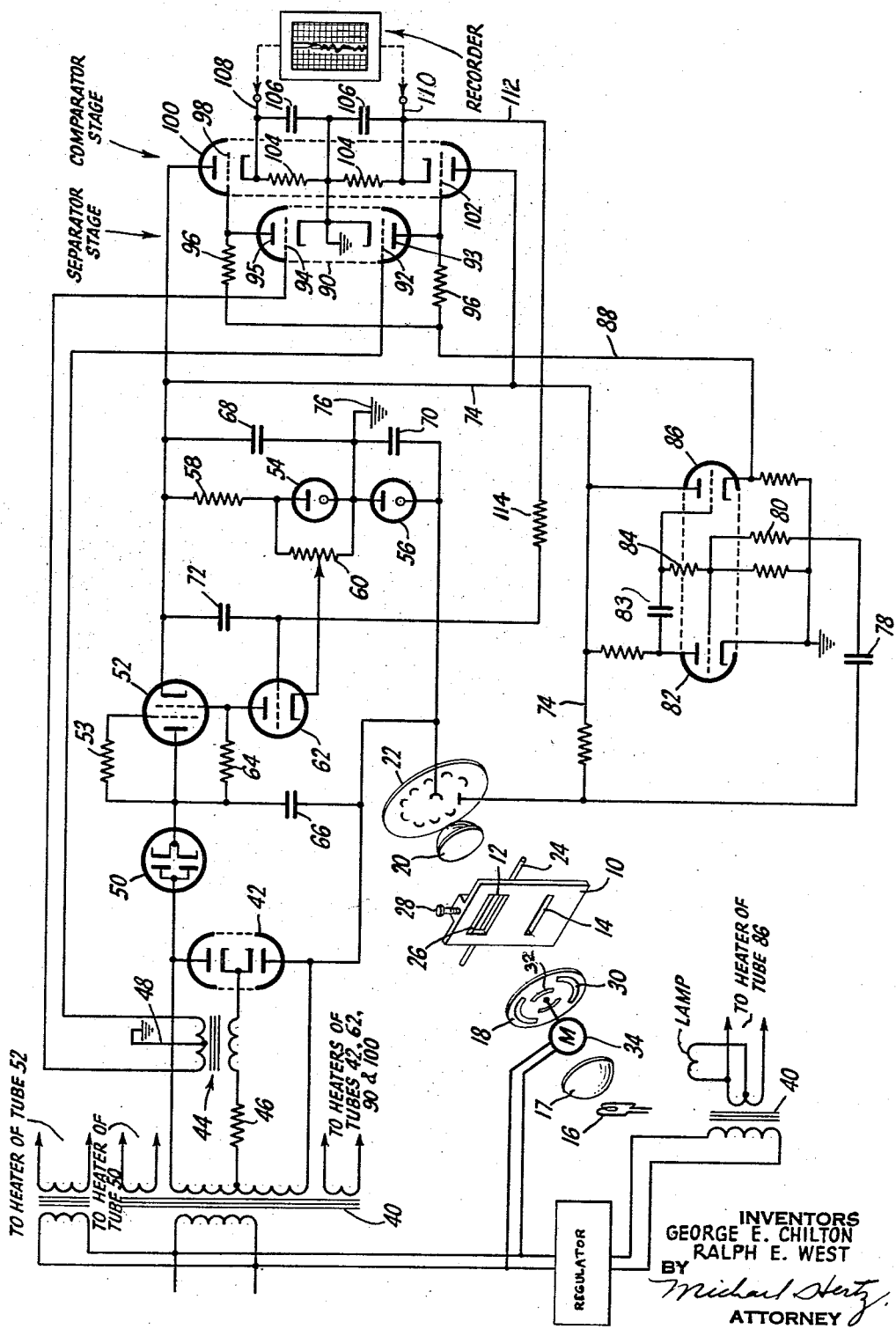
INVENTORS
GEORGE E. CHILTON
RALPH E. WEST
BY
Michael Hertz
ATTORNEY

United States Patent Office 2,850,645
Patented Sept. 2, 1958

2,850,645

CONTINUOUS READING ELECTRONIC MICROMETER

George E. Chilton and Ralph E. West, Emporium, Pa., assignors to Sylvania Electric Products Inc., a corporation of Massachusetts Application February 16, 1954, Serial No. 410,551

5 Claims. (Cl. 250—232)

The invention relates to electronic measurements of the occlusion of an energy beam by an article which is passing through the beam whether it be because of different densities of different portions of the article or because of different transverse dimensions therealong.

In particular it relates to the continuous measurement of the diameter of an object, such as a wire or a cathode sleeve, passing through a light beam.

In a practical application of the invention the running diameter of a wire or a cathode is measured by passing the same in the direction of its longitudinal axis in front of an illuminated slit and comparing the amount of light transmitted from the slit past the object and impinging on a photocell with the amount of light on the same photocell from the same source passing through another or standard unobstructed slit. To obtain this comparison, a shutter revolves in front of the two slits to gate the beam so that alternately the photocell responds to the light from the obstructed slit and to the light from the standard unobstructed slit. By observing a meter or recording instrument the difference in light intensities as continuously translated by the novel circuit arrangement of our invention, can be observed and this observation can be translated into diameters of the object.

It is an object of the invention to provide novel means which shall be sensitive to light variations due to varying diameters of the object being measured.

It is a further object to provide a novel circuit which shall make known the variation in light transmission of an object as it traverses an energy beam.

It is a still further object to provide a novel means for synchronizing the gating of the beams of light through the two slits with the operation of pulse separating means in the measuring instrument.

It is yet another object of the invention to provide electronic means to maintain at a constant magnitude the electrical representation of the gated beam of light passing through the standard slit.

Yet another object is to obtain this constant magnitude by automatically varying the voltage on the photocell to compensate for undesired changes taking place in the apparatus.

These and other objects will become apparent after reading the following specification and claims when taken in conjunction with the accompanying drawing in which the figure diagrammatically discloses the diameter sensing mechanism and the circuit associated therewith to give a continuous indication of the light transmission of an object passing by one of a pair of slits.

Referring to the drawing in greater detail, there is represented at 10 a window frame having two parallel openings 12 and 14, forming slits through which pass beams of light. These beams originate at a single point source 16, the light from that source being collimated by a lens 17 and then reaching the slits via openings in a revolving shutter 18. The beams from the slits are focused by a condensing lens 20 so that the image of the light source rather than the image of the window slits falls on the photo cathode of a conventional multiplier phototube 22 said tube being a light to electric energy transducer. Passed in front of one of the slits, either perpendicular to the long axis of the slit or parallel to the said axis, dependent on whether greater sensitivity of the system or greater resolution is sought, is the article whose light transmission characteristic is to be measured.

In the diagram, the object passed in front of a slit is shown as a wire 24 and that slit is additionally provided with a blade 26 movable to adjust the width of the slit so that substantially as much light passes through the slit when the wire is juxtaposed thereto as through the lower unobstructed slit, which latter may be regarded as the standard. The blade may be adjusted by any convenient means, as a thumb screw 28.

The shutter 18 is provided with a pair of arcuate slots 30 at such a radial distance from the center of rotation of the shutter as to permit light to pass through the slit 12. The shutter is further provided in this specific example with a second pair of slots 32 nearer the center of the shutter and out of phase with the first pair of slots to permit light to pass through the slit 14 in alternation with the light passing through slit 12. Of course the slits 12 and 14 are suitably spaced apart and located to register with the slots in the rotating shutter. The shutter is direct driven by a motor 34, connected into the A. C. power line, which for example, may be a conventional 60 cycle, 117 volt supply line. The drive between the motor and the shutter is in a 1 to 1 ratio. For diagrammatic convenience the drive is shown as a straight shaft connecting the motor and the shutter, but in actual practice geared or flexible shafting may be employed. It is desirable, for greatest resolution of the diameter of the wire to revolve the motor at high speed. At 60 C. P. S. the highest synchronous motor speed is 3600 R. P. M., and the motor must be of the type wherein its rotor is always fixedly phase in either one of two positions with respect to the phase of the power line voltage. There are two pairs of openings in the shutter resulting in two pairs of electrical pulses being generated in the measuring instrument for every revolution of the motor and the shutter. This requires gating pulses twice the line frequency of 120 C. P. S. to permit proper subsequent separation of the pulses. This separation is effected by apparatus soon to be described.

The measuring device includes a supply line having suitable transformers to feed the heaters of the various tubes in the circuit and also a power transformer 40 in the high voltage secondary of which is a full wave rectifier 42, the anodes of which are connected to the ends of the high voltage winding of the transformer secondary and the cathodes of which are connected to the midpoint of the transformer secondary via a primary winding of a transformer 44 and a current limiting resistor 46. The secondary of this second transformer is center tapped and grounded, as at 48. The 120 cycle pulsating D.-C. in the primary is converted in the secondary into a 120 cycle A.-C. This provides the 120 cycles alternating current previously pointed out as being necessary for proper functioning of the pulse differentiator or pulse separator. The secondary of transformer 44 may be tuned to the 120 cycle current so as to discriminate against higher frequencies.

It is required that the sensitivity of the photocell or the photocell-amplifier combination be controlled so as to maintain at a fixed known amplitude, as measured at the comparison stage, the pulses corresponding to the light passing the unobstructed slit. This control will be accomplished by means soon to be described.

The pulsating signal from the multiplier phototube 22 is fed via condenser 78 and resistor 80 to the grid of a phase inverter triode 82. Some of the output signal from the inverter 82 is fed back to the grid via condenser 83 and resistor 84 to reduce the overall gain of the stage and to provide the inherent stability of a negative feedback amplifier. Gain is not necessary in this stage as its primary function is to invert the output from the multiplier phototube. The output from the phase inverter 82 is fed to a cathode follower 86. The cathode follower is used to permit the remainder of the circuit to be remotely located without loss of signal in the connecting cables. From the cathode follower, the pulses are fed via lead 88 to the anodes of a pulse separator stage, comprising duo-triode 90, whose grids are controlled by the 120-cycle alternating current produced as previously described. The pulses from the phototube, while appearing at both anodes of the duo-triode 90, are treated differently by each of the halves of the duo-triode. If, for example, the grid 92 be in positive phase, the signal at the corresponding anode 93, which should correspond to the measuring signal, would be shunted to ground. Since the other grid 94 is 180° out-of-phase, the measuring signal at its corresponding anode 95 is not so shunted to ground. The resistors 96 form a dividing network to prevent the entire signal appearing on line 88 from being shunted out. Since the gating of the duo-triode is synchronized with shutter rotation, the voltages appearing at the anodes 93 and 95 will correspond to the amount of light passing through the respective slits 12 and 14. The non-grounded out measuring voltage appearing at the anode 95 is applied to the grid 98 of a comparator duo-triode 100 while the non-grounded out standard voltage appearing at the anode 93 is applied to the grid 102 of the same duo-triode. The two portions of the duo-triode are cathode connected to ground via resistors 104, and each of the resistors is shunted by signal storage condenser 106. As a result, peak values of the signal pulses due to the passage of light through the two slits 12 and 14 will be averaged and placed in opposition to one another, and the difference voltage appearing across the resistor-condenser combination will appear at the output leads 108 and 110 of the instrument. These leads may be connected to any suitable form of exhibiting instrument, such as a meter or continuous recorder.

It should be noted that the D.-C. value appearing on the line 112 (connected to line 110) and which is the average of the peak values of the standard pulses is used to control the sensitivity of the multiplier phototube, so that in spite of changes in line voltage, aging of light source, changes in photocell sensitivity, etc., the D.-C. value appearing on the line 112 will have a value which is essentially under control at all times of a reference voltage obtained from series connected VR tubes 54 and 56 and current limiting resistor 58. This reference potential is obtained from the center arm of a potentiometer 60, which is used so that the reference voltage can be adjusted to a suitable value.

The D.-C. value appearing on line 112 is fed back through the smoothing resistor 114 to the grid of triode 62. The grid of tube 62 is also controlled via condenser 72 by the ripple component of D.-C. voltage appearing at the cathode of tetrode 52. The reference potential from the center arm of potentiometer 60 is supplied to the cathode of triode 62. A potential which is a function of the difference between the grid and the cathode voltage of triode 62 appears at the plate of triode 62. This plate is connected to the rectifier via a resistor 64. The plate in turn is directly connected to the grid of regulator tube 52 controlling the impedance of tetrode 52 and thereby exercises control on the voltage appearing at the cathode of tetrode 52. The voltage applied to the plate of tetrode 52 and to the screen grid via plate load resistor 53 is obtained from a half wave rectifier circuit comprised of the high voltage winding of transformer 40, rectifier tube 50 and filter condenser 66. This controlled voltage is applied via line 74 to the multiplier phototube 22. A lesser voltage is applied to the remaining tubes in the circuit through provision of the ground return at 76. As the amplification of the multiplier phototube is exponentially proportional to the applied D.-C. potential, overall gain control over a wide range is thus achieved.

We have thus provided an instrument which, notwithstanding changes in intensity of the light source or changes in the instrument due to aging of components, will give accurate indications of the transmission characteristics of an object traversing the measuring slit.

What is claimed as new is:

1. In a measuring instrument, means providing a source of light, a window having two slits through which beams of light from said source pass, a synchronous motor driven at maximum speed at line frequency, a shutter driven in 1 to 1 ratio from said motor and having plural pairs of slots for gating said beams through the two slits, means for causing the gated beams of light to impinge on a transducer to convert the energy of the gated light beams into electrical pulses, means for feeding the train of pulses comprised of alternate pulses corresponding with the alternate gating of the two beams of light to an electronic two part separator in order to separate the two sets of pulses into two trains each corresponding to its respective beam of light, means for gating each part of said separator at a frequency equal to half the frequency of light impingement on the transducer, means under control of said two separated trains of pulses for setting up continuous but averaged electrical potentials proportional to the magnitude of the pulses with averaged potentials in opposition to one another, whereby continuous exhibiting of the resultant potential may be obtained.

2. In a measuring instrument, means providing a source of light, a window having two slits through which beams of light from said source pass, a synchronous motor adapted to be connected to an A.-C. line and rotating at a speed equal to the line frequency, a shutter connected to the motor and driven at motor speed, said shutter having a pair of slots circumferentially spaced, a second circumferentially spaced pair of slots in said shutter, said first pair of slots gating the light through one slit, said second pair of slots gating the light through the second slit, means for causing the gated beams to impinge on a transducer to convert the energy of the gated beams of light into electric pulses, means for feeding the train of pulses comprised of pulses resulting from the alternate gating of the two beams of light in alternation to a pair of grid controlled tubes, each of said tubes also having an anode and a grounded cathode, a full wave rectifier adapted to be connected to the same A.-C. line, said rectifier having a portion of its circuit carrying a ripple component at twice line frequency, a transformer in said portion of the circuit, the secondary of said transformer being grounded substantially at its midpoint, means connecting the ends of the secondary with the grids of the tubes, means for feeding each of the pulses to the anodes of both tubes to thereby separate said train of pulses into two trains of pulses each corresponding to its respective beam of light, means under control of said two separated trains of pulses for setting up continuous electrical potentials proportional to the magnitude of the pulses in opposition to one another, whereby continuous exhibiting of the resultant potential may be obtained.

3. In a measuring instrument, means providing a source of light, a window having two slits through which beams of light from said source pass, means for alternately gating said beams through the two slits, means for causing the gated beams of light to impinge on a transducer to convert the energy of the gated light beams into electrical pulses, means for feeding the train of pulses comprised of alternate pulses corresponding with the alternate gating of the two beams of light to an electronic separator in order to separate the two sets of pulses into two trains each corresponding to its respective beam of light, means under control of said two separated trains of pulses for setting up continuous but averaged electrical potentials proportional to the magnitude of the pulses, with the averaged potentials in opposition to one another, whereby continuous exhibiting of the resultant potential may be obtained, and means under control of the light passing through one slit to regulate the voltage applied to portions of the measuring instrument.

4. In a measuring instrument, means providing a source of light, a window having two slits through which beams of light from said source pass, means for alternately gating said beams through the two slits, means for causing the gated beams of light to impinge on a multiplier phototube to convert the energy of the gated light beams into electrical pulses, means for feeding the train of pulses comprised of alternate pulses corresponding with the alternate gating of the two beams of light to an electronic separator in order to separate the two sets of pulses into two trains each corresponding to its respective beam of light, means under control of said two separated trains of pulses for setting up continuous but averaged electrical potentials proportional to the magnitude of the pulses, with the averaged potentials in opposition to one another, whereby continuous exhibiting of the resultant potential may be obtained, and means under control of the light passing through one slit to regulate the voltage applied to portions of the measuring instrument including the multiplier phototube.

5. In a measuring instrument, means providing a source of light, a window having two slits through which beams of light from said source pass, means for alternately gating said beams through the two slits, means for causing the gated beams of light to impinge on a transducer to convert the energy of the gated light beams into electrical pulses, said transducer having an energy gain or sensitivity which is a function of an applied voltage, means for feeding the trains of pulses comprised of alternate pulses corresponding with the alternate gating of the two beams of light to an electronic separator in order to separate the two sets of pulses into two trains each corresponding to its respective beam of light, means under control of one separated train of pulses corresponding to one of the beams of light to vary the voltage applied to the transducer in such a manner as to keep at a constant amplitude the pulses in the pulse train exercising this control, means under control of said two separated trains of pulses for setting up continuous but averaged electrical potentials proportional to the amplitudes of both trains of pulses, with the averaged potentials in opposition to one another, whereby continuous exhibiting of the resultant difference of potentials may be obtained, said difference of potentials being a linear function of the ratio of the intensities of the two gated beams of light by virtue of the control exercised on the gain of the system in keeping at a constant value the electrical representation of the intensity of one of the gated beams.

References Cited in the file of this patent

UNITED STATES PATENTS

| | | |
|---|---|---|
| 2,474,098 | Dimmick | June 21, 1949 |
| 2,548,755 | Vossberg et al. | Apr. 10, 1951 |
| 2,583,143 | Glick | Jan. 22, 1952 |
| 2,653,247 | Lundahl | Sept. 22, 1953 |
| 2,678,581 | Reisner | May 18, 1954 |